United States Patent [19]

Sommer et al.

[11] 4,343,779

[45] Aug. 10, 1982

[54] PROCESS FOR THE CONDENSATION OF PHOSPHATE SOLIDS

[75] Inventors: Klaus Sommer, Heidelberg; Walter Klemm, Weinheim Ortsteil Rippenweier; Hermann Weber, Hemsbach; Frederick Meinhardt, Birkenheide; Gerhard Schönmann, Ludwigshafen; Wilhelm Spatz, Ober-Kainsbach, all of Fed. Rep. of Germany

[73] Assignee: Benckiser-Knapsack GmbH, Ladenburg, Fed. Rep. of Germany

[21] Appl. No.: 239,975

[22] Filed: Mar. 3, 1981

Related U.S. Application Data

[62] Division of Ser. No. 123,754, Feb. 22, 1980, Pat. No. 4,293,526.

[30] Foreign Application Priority Data

Feb. 26, 1979 [DE] Fed. Rep. of Germany ....... 2907453

[51] Int. Cl.$^3$ ....................... C01B 15/16; C01B 23/26
[52] U.S. Cl. ..................................... 423/305; 423/314; 423/315
[58] Field of Search ............... 423/304, 305, 306, 315, 423/314; 159/6 W

[56] References Cited

U.S. PATENT DOCUMENTS

| | | | |
|---|---|---|---|
| 2,883,272 | 4/1959 | Kirk | 23/260 |
| 3,397,036 | 4/1968 | Narins et al. | 423/305 |
| 3,549,334 | 12/1970 | Schneider et al. | 23/285 |
| 3,592,609 | 7/1971 | Honbo | 23/260 |
| 3,682,091 | 8/1972 | Bredeson | 23/290.5 |
| 3,953,443 | 4/1976 | Ohata et al. | 260/248 A |
| 3,964,874 | 6/1976 | Maruko et al. | 23/285 |

FOREIGN PATENT DOCUMENTS

| | | |
|---|---|---|
| 818801 | 10/1951 | Fed. Rep. of Germany . |
| 764763 | 5/1952 | Fed. Rep. of Germany . |
| 972118 | 5/1959 | Fed. Rep. of Germany . |
| 1557119 | 3/1970 | Fed. Rep. of Germany . |
| 2012294 | 3/1970 | Fed. Rep. of Germany . |
| 1542016 | 4/1970 | Fed. Rep. of Germany . |

OTHER PUBLICATIONS

Chemical Abstracts, vol. 85, No. 1, p. 461, #5693t (1976).

Primary Examiner—O. R. Vertiz
Assistant Examiner—Gregory A. Heller
Attorney, Agent, or Firm—Schwartz, Jeffery, Schwaab, Mack, Blumenthal & Koch

[57] ABSTRACT

A process and apparatus for condensing solid materials such as phosphates which tend to sinter and adhere when heated in a reactor wherein the reactants are introduced into a trough-like reactor provided with at least one set of rotatable agitating paddles. Heat is supplied to the reactor by passing a heating medium, such as a molten salt or a molten metal, through one or more heating jackets on the exterior of the reactor housing. The agitating paddles press the solid material in a thin layer against the wall of the reactor housing, and the material in the layer absorbs heat from the heating medium and sinters to a hard layer. One paddle of each set of paddles is provided with a stripping knife which moves along a path closely adjacent to the exterior wall of the reaction chamber to strip sintered material from the wall of the reactor housing. Heat is also transferred to the interior of the reactor housing by circulating the peeled material through the interior region of the reactor housing.

13 Claims, 3 Drawing Figures

PROCESS FOR THE CONDENSATION OF PHOSPHATE SOLIDS

This is a division of application Ser. No. 123,754, filed Feb. 22, 1980, now U.S. Pat. No. 4,293,526.

BACKGROUND OF THE INVENTION

The present invention relates to a process for the condensation of solids, particularly phosphates, which tend to sinter and/or adhere during condensation when heated in a reactor.

Processes of this type include the condensation of acidic alkali, alkaline earth and heavy metal monophosphates or ammonium metal monophosphates to the corresponding polyphosphates, for example the condensation of monosodium monophosphate to disodium diphosphate and further to Madrell's salt or trimetaphosphate; the condensation of disodium monophosphate to tetrasodium diphosphate; the condensation of lithium monophosphate to the corresponding di- and polyphosphates, and the condensation of monocalcium and monomagnesium monophosphates through the diphosphates to the corresponding polyphosphates.

The following may be cited as examples of the conversion of heavy metal monophosphates:

The production of aluminum tripolyphosphate or aluminum metaphosphate from aluminum monophosphate, and the condensation of zinc, manganese or copper diphosphate from the corresponding monophosphates.

Further examples are the manufacture of boron phosphate by condensing boric acid with ammonium phosphate, the formation of ammonium polyphosphate from urea phosphate, or the production of melamine polyphosphates.

In the condensation of urea to cyanuric acid and in the formation of phosphorus nitride oxide or phosphorus nitride sulfide, the adhesion of the products causes significant difficulties in that the final product adheres to the walls of the reactor and interferes with the transfer of heat, thereby decisively affecting the degree of conversion.

A method and an apparatus for carrying out high temperature processes at temperatures in excess of 300° C. is disclosed in DE-OS No. 15 42 016, wherein in a screw extruder with one or more worm shafts the initial product is at first heated overwhelmingly by the internal mechanical friction to a degree sufficient to transform it through a viscous, paste-like state, to a mass of reduced viscosity which is then supplied with the necessary heat by means of direct heat transfer. Such devices are in principle unsuitable for carrying out condensation reactions because the mixing effect is inadequate so that the conversion remains incomplete.

Further, mixing machines are disclosed in DE-OS No. 15 57 119 and DE-OS No. 20 12 294, which are provided with cylindrical or trough-like housings equipped with agitators and kneading bars and/or disk-like mixing elements. Only processes in which the temperature does not exceed approximately 350° C. can be carried out in mixers of this type.

OBJECTS OF THE INVENTION

It is an object of the present invention to provide a process and apparatus for condensing solid materials which tend to sinter and adhere when heated in a reactor.

A further object of the present invention is to provide a process and apparatus for condensing solids which provides for efficient transfer of heat from the outside of the reactor to the material in the interior of the reactor.

A further object of the present invention is to provide a process and apparatus for condensing solid materials in which different amounts of heat may be supplied to different sections of the reactor housing.

Another object of the present invention is to provide a process and apparatus for condensing solid materials in which adequate mixing and complete conversion of the materials is assured.

Another object of the present invention is to provide a process and apparatus for condensing solid materials wherein condensation reactions may be effected at temperatures ranging up to 700° C.

A further object of the present invention is to provide a process and apparatus for condensing solids in which a molten salt or a molten metal can be used as the heat source.

Yet another object of the present invention is to provide a process for condensing solid materials in which waste gases from the reaction are withdrawn from the reactor housing and solids entrained in the waste gases are separated and returned to the reactor.

SUMMARY OF THE INVENTION

These and other objects of the invention are achieved by providing a process for condensing solid materials which tend to sinter or adhere during condensation in a heated reactor comprising the steps of introducing a solid substance to be condensed into a reactor; heating the exterior wall of the reactor in order to heat the substance therein; agitating the material in the reactor and pressing the material in a thin layer against the reactor wall; said material sintering and adhering in a thin layer to the reactor wall; stripping the sintered layer from the reactor wall; and returning the hot sintered material to the interior region of said reactor. The objects of the invention are further achieved by providing apparatus for condensing solid materials which tend to sinter and adhere during condensation in a heated reactor, said apparatus comprising a reactor housing having an exterior wall, means for heating the exterior wall of said reactor housing, at least one set of rotatable paddles disposed in the interior of said reactor housing for agitating solid material in said reactor housing, and at least one paddle of each set being provided with blade means which passes closely adjacent the wall of said reactor housing when said set of paddles is rotated for stripping sintered material from said reactor wall.

In the process of the invention and with the apparatus of the invention, condensations may be performed at temperatures up to approximately 700° C., when the contents of the reactor are pressed in a thin layer against the wall of the reactor after mixing and subsequently the condensed (hard) layer is stripped from the reactor wall and returned to the interior of the reactor.

Advantageously, a molten salt or molten metal is utilized for the transfer of heat in the instant process. The heat is thereby initially imparted to the condensed layer and thereafter transferred to the interior of the reactor by peeling or stripping the condensed layer from the wall.

If a reactor equipped with a plurality of separate heating jackets along its length is used in carrying out the process, it is readily possible to apply different temperatures over the length of the reactor.

The waste gases formed during the condensation reaction are drawn off and are diluted with air and any reaction product entrained in the waste gases is separated and optionally returned to the reactor.

BRIEF DESCRIPTION OF THE DRAWINGS

The invention will be described in further detail with reference to the accompanying drawings wherein.

DETAILED DESCRIPTION OF THE INVENTION

Figure 1:
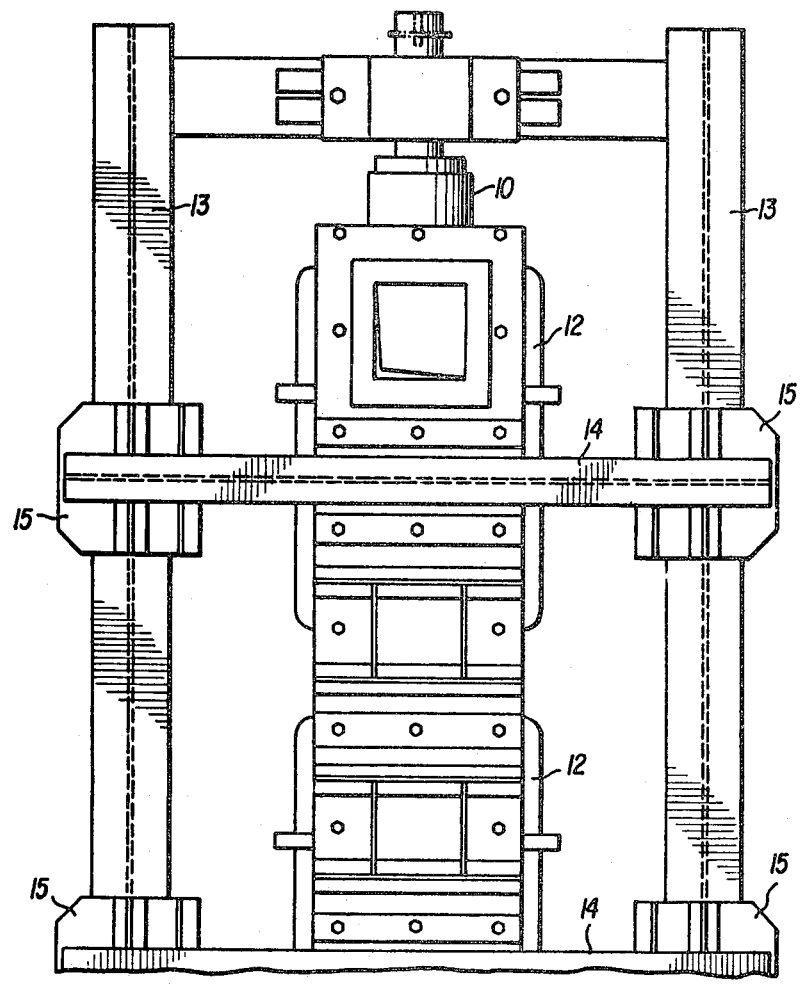
FIG. 1 is a partial top plan view of an apparatus according to the invention.
Figure 2:
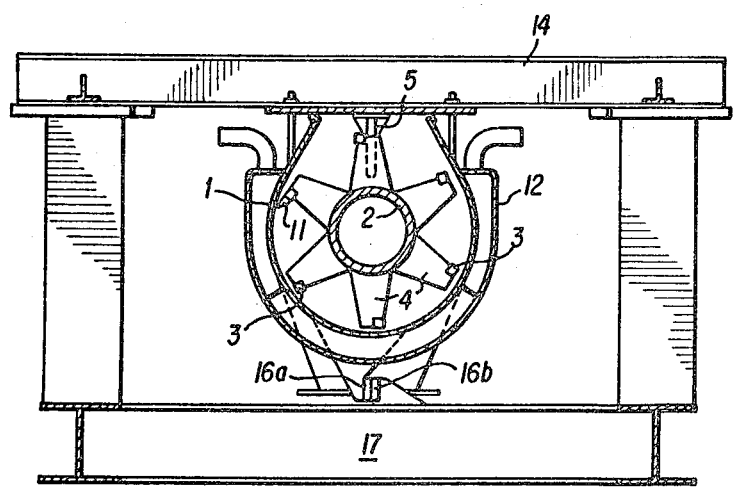
FIG. 2 is a transverse sectional view of the apparatus of FIG. 1.
Figure 3:
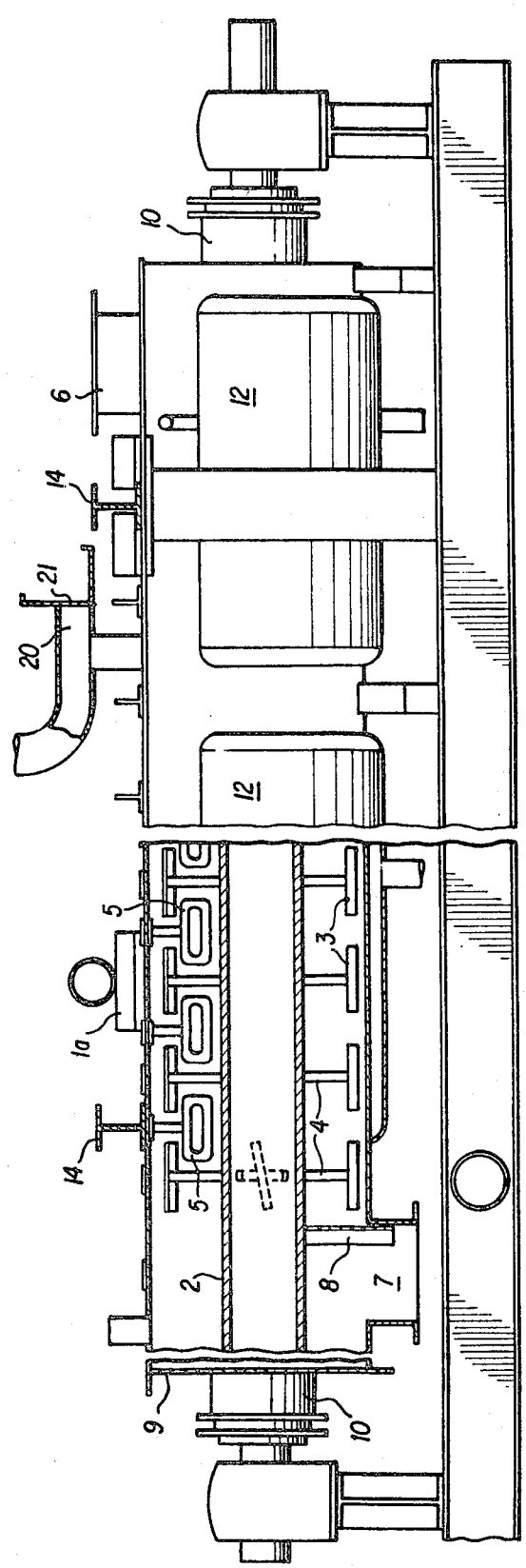
FIG. 3 is a longitudinal elevation, partially in section, of the apparatus of FIG. 1.

To carry out the process of the invention, one can use an apparatus comprising a reactor housing 1 in the shape of a trough, suspended in a freely movable manner on transverse supports 14, which are supported in turn on longitudinal beams 13 by means of slide bearings 15. The reactor housing contains a rotating shaft 2 upon which a number sets of paddles 3 are mounted in several planes by means of paddle supports 4. The paddles 3 are disposed at an angle with respect to the axis of the shaft and thus effect the axial transport of the product. The top of the reactor housing is equipped with covers 1a to which a scraper bow or stirrup 5 is secured between each pair of adjacent sets of paddles for stripping the adhering product from the shaft and the paddle holders.

An inlet 6 is provided for introducing the reaction components. Outlet 7 serves for removal of the reaction product. The shaft 2 is sealed with respect to the end plates 9 of the housing by packing sleeves 10.

A paddle with a stripper blade or knife 11 mounted thereon is arranged in each of the sets of paddles. Blade 11 serves to strip or peel the condensed layer from the wall of the reactor. In this way, optimum heat transfer from the heating surface to the product is made possible. The paddle blades 11 are designed so that only a minimal amount of energy is required for the cleaning operation due to the stripping action and the cutting effect of the blade.

A plurality of separate heating jackets 12 are secured to the reactor housing 1, designed so that they may be supplied with heating media at different temperatures. The jackets are also capable of compensating for the differences in thermal expansion of the reactor housing on one side and of the walls of the heating jackets on the other.

To absorb the torsional forces of the reactor housing, abutments 16 are disposed adjacent the bottom of the housing, said abutments comprising two parts 16a and 16b, with one thereof (16a) being secured to the housing and the other (16b) to the trough support structure 17, wherein the two parts 16a and 16b are longitudinally displaceable with respect to each other.

In the preferred embodiment of the process, the substance to be condensed is introduced into the reactor by means of the inlet fitting 6 by means of a charging screw, a conveyor or a star feeder lock. Care must be taken in the process to keep the filling level of the reactor at the optimum point for the product being manufactured. Thus, in the case of products which tend to form readily, it is advisable, for example, to aim at a filling level that extends only slightly above the shaft 2. The filling height is regulated by means of a weir 8 placed in front of the outlet and by varying the rate of rotation of the shaft 2 or by varying the angle of inclination of the paddles. In the first phase of the process, the material in the reactor housing is pressed by the paddles into a thin layer against the wall of the reactor housing, which is heated from the outside with molten salt.

The stripping blade following in each set of paddles scrapes the heated and partially condensed material from the walls of the reactor and mixes it with the material in the interior of the reactor, whereby simultaneously the transfer of heat is effected from the heated wall via the material being stripped off.

An exhaust duct 20 is provided communicating with the interior of reacting housing 1 through which waste gases from the reaction may be withdrawn by means of an exhaust fan (not shown). Means, such as inlet 21, are provided associated with said duct for introducing atmospheric air into the stream of waste gases to dilute the waste gases. The diluted gases may be routed to a precipitator or separator where entrained solid material is separated, and the separated solids may be returned to the reactor.

The amount of reaction ingredients fed to the reactor is controlled so that this sequence of operations is repeated until the reaction product present in the final section of the reactor prior to the outlet is at the reaction temperature at which condensation is completed. The final product obtained in this manner is conveyed over the weir 8 to the outlet 7 and discharged.

In carrying out reactions of this type wherein the temperature is to be variable over the course of the reaction, the heating jacket is divided into separate sections, the so-called heating pockets, which may be supplied with heating media at different temperatures.

EXAMPLE 1

A reactor according to the invention with a trough length of 320 cm is charged over a period of one hour with 70–75 kg of a mixture of 98.8 parts by weight crystalized or spray dried monosodium phosphate and 1.2 parts by weight monoammonium phosphate. A 1% solution of the monosodium phosphate should exhibit a pH of 4.5. If the temperature of the product at the outlet fitting is maintained at 355°–360° C., requiring a salt melt temperature of 450°–470° C., a sodium polyphosphate with a content of at least 98.5% Maddrell's salt is obtained. A capacity of 300–320 kg/hour is achieved with a reactor having a trough with a length of 600 cm and a diameter of 70 cm.

EXAMPLE 2

In a mixer, 100 parts by weight monosodium phosphate are mixed thoroughly with 1.5 parts by weight sodium carbonate. This preliminary mixture is introduced continuously at a rate of 60 kg/hour from a supply chute, feeder screw or star feeder lock into a reactor according to the invention having a trough length of 320 cm. At molten salt temperatures of 470°–520° C., product temperatures between 380° and 440° C. are obtained. The product is a sodium trimetaphosphate containing from 0.5 to 2% water-insoluble components, measured in a 5% slurry. Additionally, traces of pentasodium tripolyphosphate could be detected.

EXAMPLE 3

The abovedescribed reactor is charged by means of a batching device, such as a metering conveyor scale, with 30.6 kg calcium hydroxide and by means of a sprayer disposed above the kneading shaft with 66 liters of 75% phosphoric acid per hour. With a molten salt temperature of 520° C., a product temperature of 280°–290° C. is obtained. Calcium pyrophosphate is produced at a rate of approximately 90 kg per hour, showing a heating loss of 8.8%.

EXAMPLE 4

A laboratory reactor with the abovedescribed configuration, a trough length of 80 cm and a trough diameter of 18 cm, is charged at 150° C. with 10 kg monolithium orthophosphate. After increasing the temperature of the heating medium to 400°–420° C., 6–7 kg of a lithium orthophosphate solution, prepared from lithium hydroxide and 75% phosphoric acid, are introduced hourly by a controlled volume pump through an injector tube into the front part of the reactor. The resulting lithium polyphosphate, which is only slightly soluble in water, is discharged from the reactor in the form of a free-flowing product at a temperature of 320°–350° C.

EXAMPLE 5

A mixture of 44.6% dicyandiamide, 37.7% phosphorus pentoxide and 17.7% urea is prepared under anhydrous conditions. The reactor installation described in Example 1 is charged under anhydrous conditions with 55–60 kg of the abovementioned mixture each hour while the heating jacket in the first one-third of the reactor adjacent the inlet is maintained at a temperature of 250°–260° C. The remaining two-thirds of the reactor are heated by a heating medium at a temperature of 420°–460° C. The product is a compound of approx. 15% phosphorus, 37% nitrogen and carbon particularly suitable for the flame-inhibiting treatment of thermoplastic molding materials, such as polyamides, in accordance with DE-OS No. 26 47 120.

EXAMPLE 6

Into a laboratory reactor (trough length 80 cm), with a heating jacket adjacent the front part maintained at 250° C. and the heating jacket in the rear part adjacent the outlet maintained at 500° C., 5 kg of a mixture of 35% by weight boric acid and 65% by weight ammonium orthophosphate are introduced hourly. The boron phosphate formed leaves the reactor at a temperature of 410°–420° C. and includes a water soluble component amounting to less than 2%. When a larger reactor is used, such as described in Example 1, the preparation of the preliminary mixture may be eliminated, and boric acid and monoammonium phosphate in a weight ratio of 30:65 may be introduced simultaneously through separate charging devices, whereby the amount that may be converted each hour is approximately 60 kg.

EXAMPLE 7

Into a reactor with a trough length of 320 cm, the heating jacket of which is supplied with a salt melt at a temperature of 340°–370° C., 42.05 melamine are introduced per hour through a screw feeder. Simultaneously, by means of a piston pump and a tube with four nozzles, 43.55 kg 75% phosphoric acid per hour are added. The resulting water vapor exits the reactor through two gas outlets. The heating temperature should be adjusted so that the melamine diphosphate produced achieves a temperature of 265°–275° prior to leaving the reactor.

To prepare melamine polyphosphate, the melamine diphosphate is condensed with urea in a second reaction step. For this purpose, the first one-third of the reactor is maintained at a jacket temperature of 180° C., while the rest of the heating jacket is charged with a molten salt at a temperature of 380° C. during the reaction. A mixture of 107 kg melamine diphosphate and 15.5 kg urea per hour is introduced from a supply chute while the rate of rotation of the reactor shaft should amount to 10–12 rpm.

EXAMPLE 8

The reactor described in Example 1 is heated with a molten salt to a prerun temperature of 440° C., and is filled with 120 kg aluminum tripolyphosphate. As soon as the charge reaches a temperature of 380° C., an aluminum orthophosphate solution, prepared from aluminum oxyhydrate and 75% phosphoric acid at 80°–90° C., is sprayed in at a temperature of 80°–90° C. The amount of the orthophosphate solution introduced is controlled by a piston pump so that a product temperature of 370°–380° C. is obtained at the outlet. The resulting aluminum phosphate shows a heating loss of 6.5% at 600° C.

The preparation of aluminum methaphosphate is effected in a similar manner, except that the heating temperature is adjusted to 540° C. and the product temperature to 460° C.

EXAMPLE 9

The previously described laboratory reactor, at a heating bath temperature of 160° C. and a shaft rotation rate of 12 rpm, is slowly filled with 3.25 kg zinc oxide, while 10.45 kg 75% phosphoric acid are simultaneously added. The temperature of the heating medium in the zone adjacent the inlet is thereafter increased to 250° C. and in the two other zones toward the outlet to 450° C., and 6–8 kg of a solution of zinc orthophosphate $Zn(H_2PO_4)_2$ obtained by the addition of zinc oxide to hot 75% phosphoric acid, are added hourly. The first 15 kg zinc polyphosphate to leave the reactor are made into a paste with the double amount of the zinc orthophosphate solution and also added to the reactor. It is also possible to charge the reactor initially with 10 kg zinc polyphosphate and then pump in the zinc polyphosphate solution.

The foregoing specific embodiments of the invention have been described solely as examples of the invention and are not intended to be limiting. Since modifications of the disclosed embodiments within the scope and spirit of the invention may occur to persons skilled in the art, the scope of the invention is to be limited solely by the scope of the appended claims.

What is claimed is:

1. A process for condensing solid phosphate materials which tend to sinter or adhere during condensation in a heated reactor comprising the steps of: introducing a solid phosphate-containing material to be condensed into a reactor; contacting the exterior wall of the reactor with a hot heat transfer medium in order to heat the phosphate material to be condensed in the reactor; agitating the phosphate material in the reactor and pressing the phosphate material in a thin layer against the reactor wall; said thin layer of phosphate material sintering and adhering to the reactor wall; stripping the sintered layer from the reactor wall; and returning the hot sintered phosphate material to the interior region of said reactor.

2. A process according to claim 1, wherein the phosphate material in the reactor is agitated at least one set of rotating paddles disposed in the interior of the reactor and at least one paddle of each set is provided with knife means for stripping the sintered phosphate material from the reactor wall.

3. A process according to claim 1, wherein the reactor is provided with at least one external heating jacket and is heated by passing said heat transfer medium through said jacket.

4. A process according to claim 3, wherein said heat transfer medium is a molten salt.

5. A process according to claim 3, wherein said heat transfer medium is a molten metal.

6. A process according to claim 3, wherein said reactor is provided with a plurality of separate heating jackets disposed along the length thereof and different amounts of heat are supplied to different portions of the reactor along its length by supplying different temperature heat transfer media to at least two of said jackets.

7. A process according to claim 1 further comprising the steps of withdrawing waste gases from the reactor; diluting the withdrawn gases with air; precipitating solid material entrained in the diluted gases; and returning the precipitated material to the reactor.

8. A process according to claim 1, wherein said phosphate material is selected from the group consisting of acidic alkali metal monophosphates, acidic alkaline earth metal monophosphates, acidic heavy metal monophosphates and ammonium metal monophosphates.

9. A process according to claim 8, wherein said phosphate material is condensed to a diphosphate.

10. A process according to claim 1, wherein said phosphate material is a mixture of boric acid and ammonium phosphate and the phosphate material is condensed to produce boron phosphate.

11. A process according to claim 1, wherein said phosphate material comprises urea phosphate and the phosphate material is condensed to form ammonium polyphosphate.

12. A process according to claim 1, wherein said phosphate material is selected from the group consisting of zinc monophosphate, manganese monophosphate and copper monophosphate and is condensed to the corresponding diphosphate.

13. A process according to claim 1, wherein said phosphate material comprises aluminum monophosphate and is condensed to a product selected from the group consisting of aluminum tripolyphosphate and aluminum metaphosphate.

* * * * *